(12) United States Patent
Lin

(10) Patent No.: US 8,007,147 B2
(45) Date of Patent: Aug. 30, 2011

(54) VEHICLE DOOR SAFETY WARNING LAMP

(76) Inventor: Yung-Fa Lin, Bangiao (TW)

( * ) Notice: Subject to any disclaimer, the term of this patent is extended or adjusted under 35 U.S.C. 154(b) by 356 days.

(21) Appl. No.: 12/436,145

(22) Filed: May 6, 2009

(65) Prior Publication Data

US 2010/0284196 A1 Nov. 11, 2010

(51) Int. Cl.
*B60Q 1/32* (2006.01)
*F21V 9/08* (2006.01)
*F21V 1/00* (2006.01)

(52) U.S. Cl. .................... 362/501; 362/510; 362/540

(58) Field of Classification Search .................. 362/494, 362/501, 503, 510, 540–543; 315/84
See application file for complete search history.

(56) References Cited

U.S. PATENT DOCUMENTS

| | | | | |
|---|---|---|---|---|
| 4,896,136 A * | 1/1990 | Hotovy | | 340/468 |
| 5,613,755 A * | 3/1997 | Gold | | 362/501 |
| 6,086,230 A * | 7/2000 | Wooldridge et al. | | 362/503 |
| 6,250,784 B1 * | 6/2001 | Kayama | | 362/494 |
| 6,619,824 B1 * | 9/2003 | Hou | | 362/501 |
| 6,749,325 B2 * | 6/2004 | Bukosky et al. | | 362/494 |
| 6,919,800 B2 * | 7/2005 | Wu | | 340/463 |
| 7,333,021 B2 * | 2/2008 | Ieda et al. | | 340/641 |

* cited by examiner

*Primary Examiner* — Alan Cariaso
(74) *Attorney, Agent, or Firm* — Leong C. Lei

(57) ABSTRACT

A vehicle door safety warning lamp is provided. A light source is respectively disposed on each side of a light socket, and each light source is electrically connected to a power supply device of a vehicle. A white or transparent first shade body and a colored (for example, red or yellow) second shade body cover the two sides of the light socket. When a vehicle door is opened, the light sources disposed on the two sides of the light socket emit lights at the same time, light rays from the first shade body are used to irradiate a traveling path of passengers, and light rays from the second shade body are used to warn other vehicles at the back, thereby improving the safety of the passengers when getting on and off the passenger vehicles (for example, buses or touring vehicles).

7 Claims, 4 Drawing Sheets

VEHICLE DOOR SAFETY WARNING LAMP

BACKGROUND OF THE INVENTION

1. Field of the Invention

The present invention relates to a lighting fixture installed on a passenger vehicle, and more particularly to a vehicle door safety warning lamp structure, which combines lighting and warning effects.

2. Related Art

Generally, common passenger vehicles, for example, buses and touring vehicles, park at bus stops or exclusive passenger regions, for passengers to get on and get off the vehicles. Usually, the bus stop or passenger region is arranged on a road shoulder. Unfortunately, when the traffic flow is rather large during the rush hour, the passenger vehicles cannot park approaching the road shoulder, so that the passengers have to get on and off the vehicles across the road where the heavy traffic passes through, which results in potential dangers for the passengers when getting on and off the vehicles. Therefore, an warning sign capable of being unfolded when the vehicle door is opened is disposed on an end edge of a vehicle door of the passenger vehicle, so as to notify other vehicles at the back that the passengers are about to get on and off the vehicle, thereby improving the safety of the passengers when getting on and off the vehicle.

However, when the vehicles are driven at night, the warning sign does not emit light, and most of the warning signs are disposed on a higher position at the end edge of the vehicle door. Thus, under a situation of insufficient lighting rays, the warning sign is useless and loses the warning effect. Furthermore, when getting on and off the passenger vehicles, the passengers must step up or down the steps disposed at the vehicle door. However, in most passenger vehicles, no lighting fixture is disposed at the vehicle door, but the residual light rays of the lighting device within the vehicle are used for lighting. The irradiation direction of the light rays is opposite to the direction of getting off the vehicle, so that the shadows of the passengers shield the steps, which results in another danger when the passengers get on and off the vehicle.

Therefore, the inventor designs a vehicle door safety warning lamp having lighting and warning effects, which combines more than two groups of lighting fixtures with different colors, thereby having both warning and lighting effects, so as to improve the safety of the passengers when getting on and off the vehicles.

SUMMARY OF THE INVENTION

Accordingly, the present invention is mainly directed to a vehicle door safety warning lamp, applicable to a large-scale passenger vehicle, so as to ensure the safety of passengers when getting on and off the vehicle.

In order to achieve the above objective, the vehicle door safety warning lamp according to the present invention includes a light socket, a first shade body, a second shade body, and two light sources. A recess is respectively disposed on two symmetric planes of the light socket, a light source is disposed in the recess, and each light source is electrically connected to a power supply device of the vehicle. A white or transparent first shade body and a colored (for example, red or yellow) second shade body are configured to cover the recesses of the light socket.

Accordingly, when a door of the passenger vehicle is opened, the power supply device supplies the power, such that the light sources disposed on two sides of the light socket emit lights at the same time, in which light rays from the first shade body are used to irradiate a traveling path of the passengers, and light rays from the second shade body are used to warn other vehicles at the back, thereby improving the safety of the passengers when getting on and off the vehicle.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
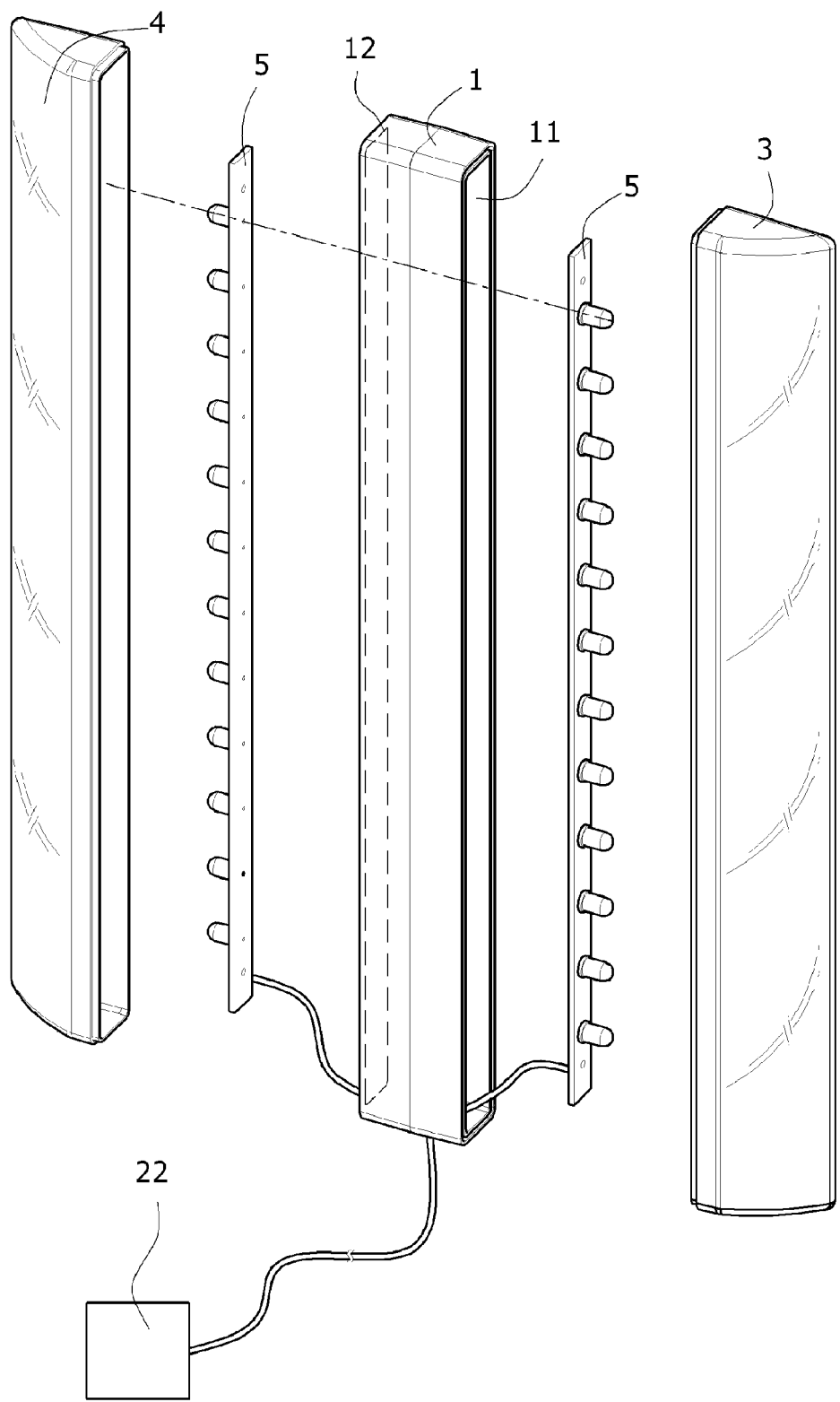
FIG. 1 is a three-dimensional exploded view of a preferred embodiment of the present invention.
Figure 2:
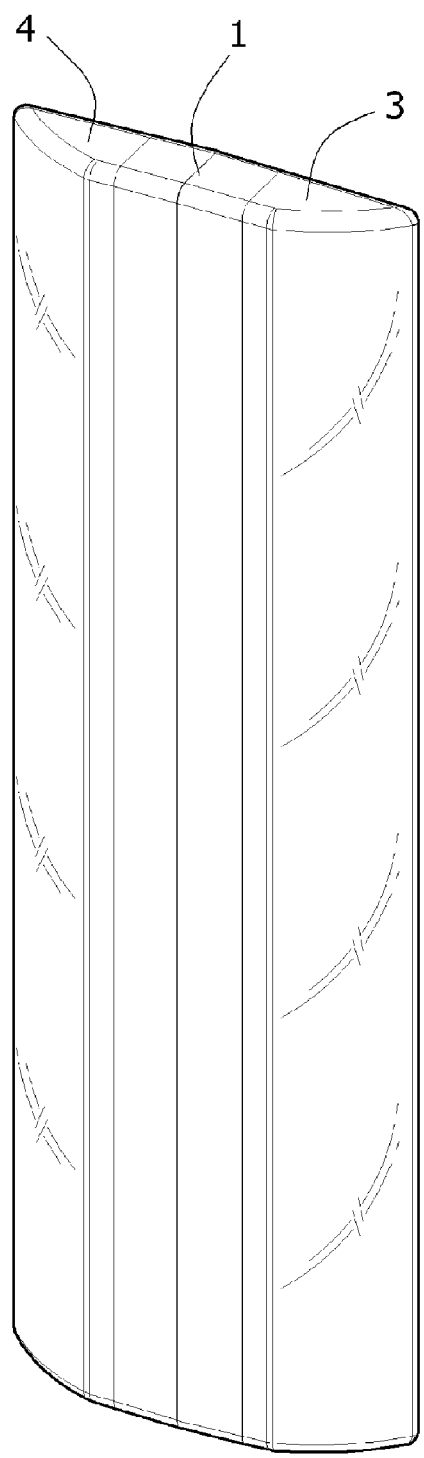
FIG. 2 is a three-dimensional combined view of the preferred embodiment of the present invention.
Figure 3:
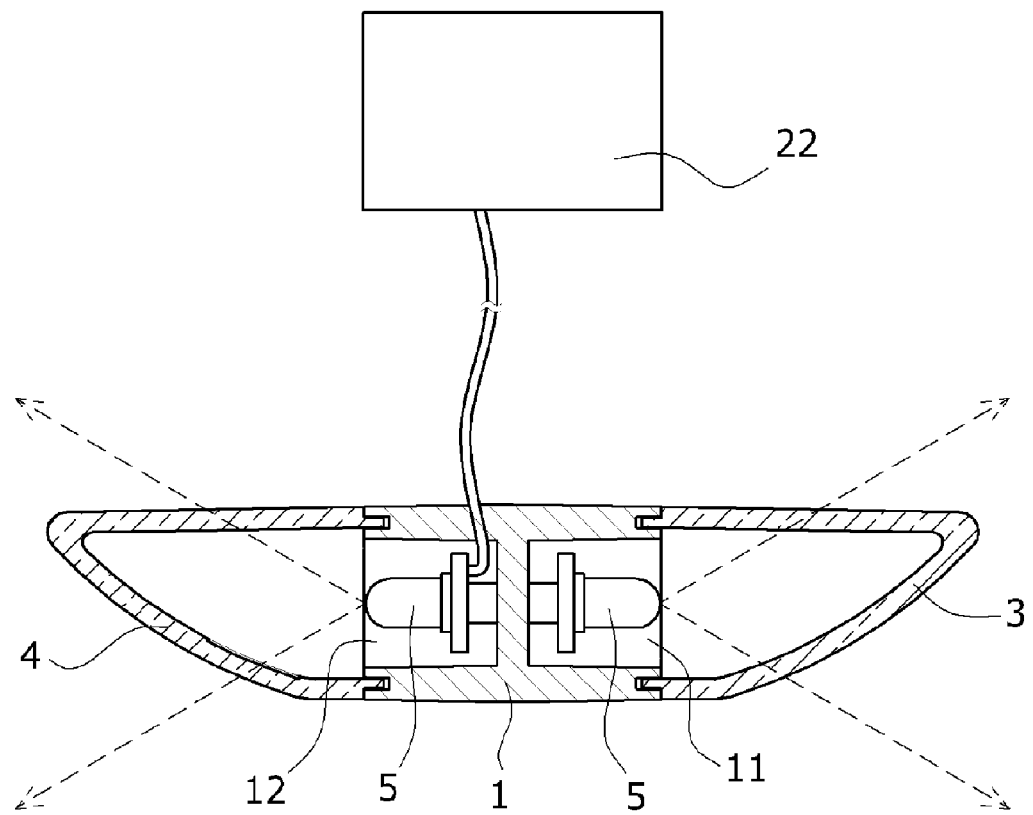
FIG. 3 is a combined cross-sectional view of the preferred embodiment of the present invention.

In order to enable the examiner clearly understand the disclosure of the present invention, the descriptions are given as follows with reference to the accompanying drawings.

Referring to FIGS. 1 to 4, a vehicle door safety warning lamp according to a preferred embodiment of the present invention includes a light socket 1, a first shade body 3, a second shade body 4, and two light sources 5.

The light socket 1 includes a first recess 11 and a second recess 12 respectively disposed on two symmetric planes thereof. The light socket 1 according to the present invention is disposed on a side edge of a vehicle door 21 of a vehicle 2.

The first shade body 3 is made of a white or transparent light-transmissive material, and covers the first recess 11 of the light socket 1. When being disposed on the side edge of the vehicle door 21 of the vehicle 2, the first shade body 3 faces a front of the vehicle 2, so as to irradiate a traveling path after the vehicle door 21 is opened.

The second shade body 4 is made of a red or yellow light-transmissive material, and covers the second recess 12 of the light socket 1. When being disposed on the side edge of the vehicle door 21 of the vehicle 2, the second shade body 4 faces a back of the vehicle 2, so as to warn other vehicles at the back that the vehicle door 21 is in an open state.

Light emitting diode (LED) light boards are used as the light sources 5 in the present invention, referring to FIG. 1. A plurality of LEDs is disposed on each LED light board. The two light sources 5 are respectively disposed in the first recess 11 and the second recess 12 of the light socket, and are electrically connected to a power supply device 22 of the vehicle 2 respectively. When the vehicle door 21 is opened, the light sources 5 disposed in the first recess 11 and the second recess 12 on the two sides of the light socket 1 emit lights at the same time, and different lights are transmitted from the first shade body 3 and the second shade body 4. Furthermore, the light source 5 disposed in the second recess 12 realizes a signal connection with a flickering device 51, such that the light source 5 may emit flickering warning lights, thereby improving the warning effect.

Figure 4:
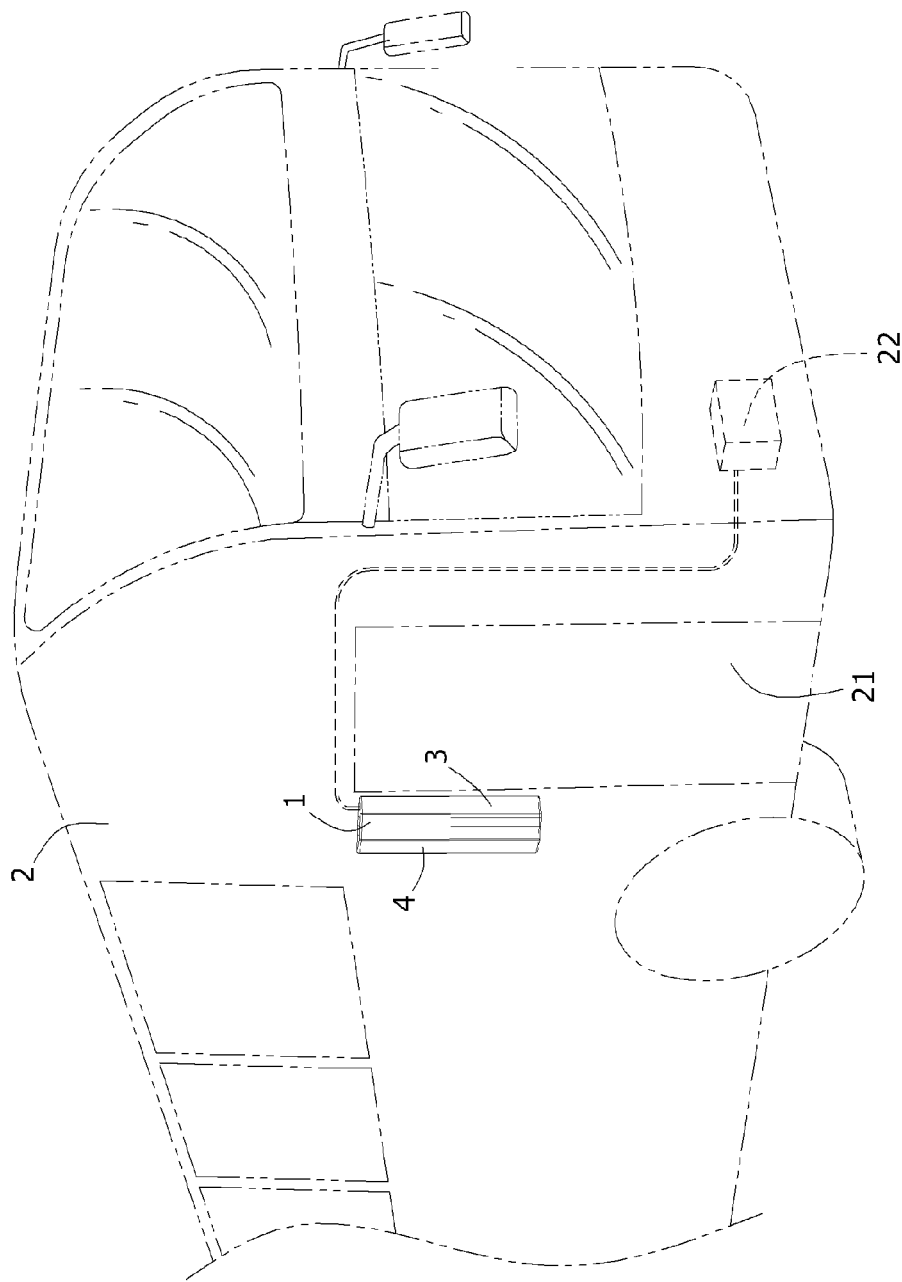
FIG. 4 is a schematic view of an installation of the preferred embodiment of the present invention.

During installation and usage, referring to FIG. 4, when the passenger vehicle 2 parks at a road shoulder for passengers to get on and off the vehicle, after the vehicle door 21 is opened, the power supply device 22 of the vehicle 2 supplies the power, such that the light sources 5 disposed on the two sides of the light socket 1 emit the lights at the same time. The light source 5 disposed on the light socket 1 corresponding to the first shade body 3 emits the lighting light rays to irradiate the traveling path of the passengers, thereby improving the safety of the passengers when getting on and off the vehicle. Furthermore, red or yellow warning light rays are emitted from the second shade body 4, so as to warn other vehicles at the back, thereby improving the safety of the passengers when getting on and off the vehicle.

As described above, referring to FIGS. 1 to 4, the present invention has the following advantages during implementation.

1. The present invention is provided with more than two groups of light sources 5, so that the lighting and warning lights are respectively emitted through the first shade body 3 and the second shade body 4 with different colors, thereby ensuring the safety of the passenger when getting on and off the vehicle.

2. Furthermore, the light source 5 disposed in the second recess 12 of the light socket 1 according to the present invention realizes a signal connection with the flickering device 51, so as to emit flickering warning lights, thereby improving the warning effect.

The above-mentioned embodiment is only the preferred embodiment of the present invention, but not intended to limit the implementation scope of the present invention. Other shapes of the light socket or shade bodies, other connection manners between the light socket and the power supply device, other selection of the light sources, or other variation manners all fall within the scope of the present invention. Therefore, those equivalent or simple variations achieved by persons skilled in the art, for example, replacing the LED light boards with common bulbs, are not regarded as a departure from the spirits and scope of the present invention, and all such equivalent variations and modifications without departing from the sprits and scope of the present invention are intended to be included within the scope of the following claims.

To sum up, the vehicle door safety warning lamp according to the present invention has the creative step and industrial applicability, so that the present application is filed for a utility model patent according to the provisions of the Patent Act.

What is claimed is:

1. A vehicle door safety warning lamp, at least comprising:
   a light socket, disposed on an edge of a vehicle door, wherein a first recess and a second recess are respectively disposed on two symmetric planes;
   a first shade body, covering the first recess of the light socket, wherein when being disposed, the first shade body faces a front of the vehicle;
   a second shade body, covering the second recess of the light socket, wherein when being disposed, the second shade body faces a back of the vehicle; and
   two light sources, respectively disposed in the first recess and the second recess of the light socket, wherein each of the light sources is electrically connected to a power supply device of a vehicle, such that when the vehicle door is opened, the light sources disposed in the two recesses on two sides of the light socket emit lights at the same time, and different lights are transmitted from the first shade body and the second shade body.

2. The vehicle door safety warning lamp according to claim 1, wherein the first shade body is made of a white light-transmissive material.

3. The vehicle door safety warning lamp according to claim 1, wherein the first shade body is made of a transparent light-transmissive material.

4. The vehicle door safety warning lamp according to claim 1, wherein the second shade body is made of a red light-transmissive material.

5. The vehicle door safety warning lamp according to claim 1, wherein the second shade body is made of a yellow light-transmissive material.

6. The vehicle door safety warning lamp according to claim 1, wherein the light sources are light emitting diode (LED) light boards.

7. The vehicle door safety warning lamp according to claim 1, wherein the light source in the second recess realizes a signal connection with a flickering device, so as to emit flickering lights.

* * * * *